May 15, 1956 — R. P. CAHN — 2,745,890
PROCESS FOR PRODUCTION OF POLYMER HYDROCARBONS
Filed March 29, 1952
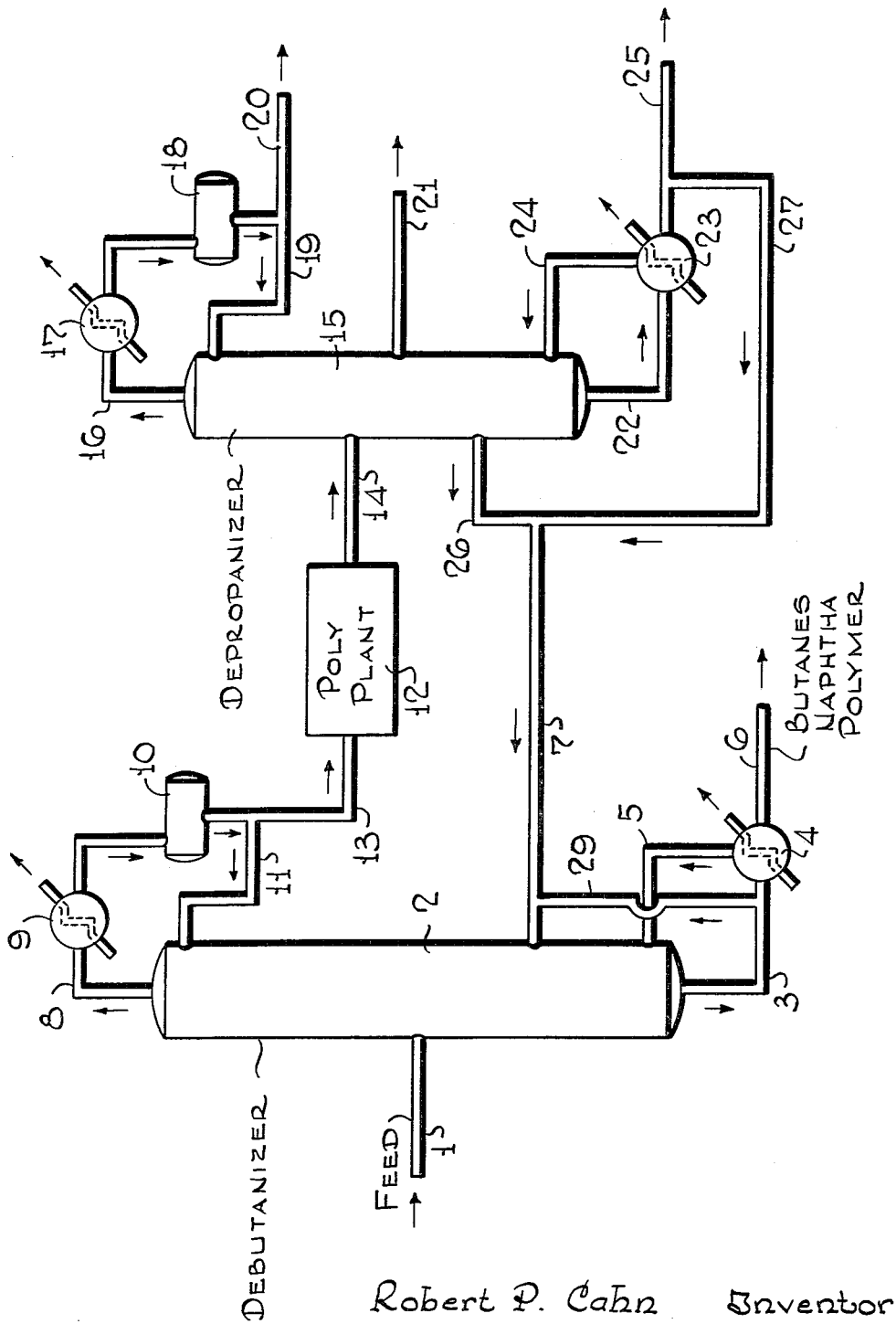
Robert P. Cahn Inventor
By W. O. T. Heilman Attorney

United States Patent Office 2,745,890
Patented May 15, 1956

2,745,890
PROCESS FOR PRODUCTION OF POLYMER HYDROCARBONS

Robert P. Cahn, Elizabeth, N. J., assignor to Esso Research and Engineering Company, a corporation of Delaware Application March 29, 1952, Serial No. 279,415

7 Claims. (Cl. 260—683.15)

The present invention is concerned with an improved process for the production of polymer hydrocarbons employing a debutanization-distillation stage, a polymerization stage and a depropanizer stage. In accordance with the present invention a relatively low temperature is secured in the bottom of a debutanization-distillation stage with an equivalent removal of desired unsaturates, as for example butenes and the like, by recycling to the debutanization-distillation stage a fraction comprising saturated butanes. By operating in accordance with the present invention the desired debutanization of a polymerized product is secured in an efficient manner. Furthermore, the desired dilution of the olefin feed to the polymerization plant is also efficiently secured.

It is well known in the art to prepare satisfactory feeds for polymerization plants by various operations, as for example by segregating by distillation a desired feed fraction from a catalytically cracked product or from a product secured by steam cracking. In a conventional type of operation a hydrocarbon fraction boiling in the range below about 430° F. and containing a relatively large percentage of olefines, such as is secured in a fluid catalytic cracking operation or in a steam cracking operation is introduced into an initial debutanization-distillation zone. In this zone temperature and pressure conditions are adjusted so as to secure a maximum removal or segregation from the fraction of the unsaturates, particularly those unsaturates having 3 and 4 carbon atoms in the molecule.

Under these conditions in order to prevent degradation of the olefinic stock, it is desirable to maintain as low a temperature as possible in the bottom of the debutanization-distillation zone consistent with a maximum recovery of unsaturated hydrocarbons containing 4 or less carbon atoms in the molecule. The pressure is sufficient to condense the overhead constituents containing the desired olefinic constituents. The condensate is then utilized as a feed to the polymerization zone.

In a polymerization zone wherein olefins having 3 and 4 carbon atoms in the molecule are polymerized to hydrocarbon constituents boiling within the motor fuel boiling range (less than about 430° F.), it is desirable to dilute the feed so that the feed contains less than about 50% of olefins. Furthermore, the polymerized product removed from the polymerization zone must be stabilized by the removal of propane and some $C_4$ hydrocarbons.

In accordance with the present invention, an improved combination process is secured wherein a lower temperature is maintained in the bottom of the debutanization-stabilization zone with an equivalent recovery of olefins, while at the same time the olefin feed to the polymerization zone is diluted to the desired extent. Furthermore, in accordance with the present invention the polymerized product is debutanized to the desired extent in an efficient manner as compared to passing the polymerized product to a subsequent distillation stage. The process of the present invention may be more fully understood by reference to the drawing illustrating an embodiment of the same.

Referring specifically to the drawing, a feed stock high in olefin content and boiling in the range from about $C_3$ to 430° F. is introduced into a debutanization-distillation zone 2 by means of feed line 1. The feed stock to zone 2 is preferably secured from a fluid catalytic cracking operation wherein hydrocarbons boiling in the gas oil and higher boiling ranges are cracked at relatively low pressures, below about 100 lbs. per sq. in., and at temperatures in the range from about 800 to 1100° F. in the presence of suitable catalyst. A suitable feed stock may also be secured from a steam cracking operation carried out in the presence of steam at temperatures in the range from about 1200 to 1500° F. and at pressures below about 200 lbs. per sq. in.

Temperatures and pressures in zone 2 are adjusted so as to secure a maximum removal of unsaturated $C_4$ hydrocarbons and at the same time keep a relatively low temperature at the bottom of the zone. Under these conditions saturated hydrocarbons having 4 carbon atoms in the molecule and higher boiling hydrocarbons are removed from the bottom of distillation zone 2 by means of line 3. These hydrocarbons are passed through a heating zone 4 and a portion of the same recycled to the bottom of zone 2 by means of line 5. The remainder of the bottoms stream is removed from the system by means of line 6 and handled or further refined as desired.

In accordance with the present invention, a liquid stream comprising saturated $C_4$ hydrocarbons and varying amounts of higher boiling hydrocarbons is introduced at an intermediate point into distillation zone 2 by means of line 7 or line 29, at a point below the point of the introduction of the feed stream. The stream introduced by means of line 7 is secured in a manner as hereinafter described. A stream comprising unsaturated $C_4$ hydrocarbons and lower boiling hydrocarbons is removed overhead from zone 2 by means of line 8, passed through a cooling zone 9 and into a distillate drum 10. A portion of the condensed overhead is recycled to zone 2 by means of line 11. The remainder of the stream comprising saturated and unsaturated $C_3$ and $C_4$ hydrocarbons is introduced into polymerization zone 12 by means of line 13.

For the purpose of description, it is assumed that polymerization zone 12 is operated at a temperature in the range from about 400 to 500° F., and at a pressure of about 500 to 1200 lbs. per sq. in. and that the catalyst comprise a phosphoric acid on a solid carrier as for example, kieselguhr. The polymerized product is removed from polymerization zone 12 by means of line 14 and introduced into a depropanizer zone 15. Temperature and pressure conditions in zone 15 are adjusted to remove overhead by means of line 16 a hydrocarbon stream comprising $C_3$ hydrocarbons and lower. This stream is passed into a condensing zone 17 and into a distillate drum 18. A portion of the distillate is recycled to zone 15 by means of line 19, while the remainder is withdrawn from the system by means of line 20. A hydrocarbon stream rich in saturated $C_4$ hydrocarbons may be removed from zone 15 by means of line 21. This stream may be utilized for blending purposes.

The polymerized product free of $C_3$ hydrocarbons and lower boiling hydrocarbons is removed from the bottom of depropanizer zone 15 by means of line 22 and heated in zone 23. A portion of these hydrocarbons are recycled to the bottom of zone 15 by means of line 24. The remainder of the stream is withdrawn from the system by means of line 25 and passed to a subsequent distillation zone where the butane is removed from the polymerized product to the desired degree.

In accordance with one adaptation of the present invention, a side stream comprising saturated $C_4$ hydrocarbons and higher boiling hydrocarbons is removed from depropanizer zone 15 by means of line 26 and recycled to zone 2 by means of line 7 as hereinbefore described. Another less preferred method of carrying out the present invention is to segregate a portion of the stream withdrawn through line 22 by means of line 27. This stream may be recycled to zone 2 by means of line 7 either alone or in conjunction with a stream withdrawn by means of line 26. If it is unnecessary to segregate a separate polymer gasoline product, the recycle is preferably withdrawn by means of line 25. If a separate polymer gasoline product is required, the recycle may be removed from zone 15 by either or both of lines 26 or 27. The polymer gasoline product is withdrawn by means of line 25.

The invention broadly comprises the integration of a debutanizer for segregating a stream rich in unsaturated C₄ hydrocarbons and lower boiling hydrocarbons in conjunction with a polymerization plant wherein it is desirable to maintain the concentration of the olefins below about 50%, in combination with a depropanizer for segregating a hydrocarbon fraction comprising the desired concentration of saturated $C_4$ hydrocarbons. By operating in the manner described, a lower temperature may be maintained in the bottom of the debutanizer for an equivalent removal and recovery of desired unsaturated $C_4$ hydrocarbons. Furthermore, the feed stream to the polymerization plant may be readily diluted to the desired unsaturated content. Furthermore, no separate debutanizer is required for debutanizing the polymer gasoline to the desired vapor pressure.

Temperatures and pressures maintained in debutanizer zone 2 may be varied appreciably. Bottom temperatures are in the range from about 250 to 450° F. while pressures vary from about 100 to 150 lbs. per sq. in. Temperatures and pressures of the depropanizer zone are in the range from about 150 to 400° F., while pressures are in the range from about 100 to 250 lbs. per sq. in.

The invention may be more fully understood by the following example illustrating the same:

EXAMPLE

Two methods of operation are given. In one operation a saturated butane stream is not recycled to the debutanizer, while in the second mode of operation a saturated butane stream is recycled. The results are as follows:

Table I.—Quantities and volatilities

| Feed Stream To Debutanizer | Ex. I. No Recycle | | | Ex. II. With Recycle | | |
|---|---|---|---|---|---|---|
| Comp. | Feed, Mols/Hr. | Debut. Overhead, Mols/Hr. | Debut. Btms., Mols/Hr. | Recycle, Mols/Hr. | Debut. Overhead, Mols/Hr. | Debut. Btms., Mols/Hr. |
| C₃'s | 150 | 150 | | | 150 | |
| C₄='s | 100 | 97 | 3 | | 97 | 3 |
| C₄'s | 100 | 97 | 3 | 146 | 177 | 69 |
| C₅ | 150 | 3 | 147 | | 3 | 147 |
| C₆+ | 500 | | 500 | | | 500 |
| | 1,000 | 347 | 653 | 146 | 427 | 719 |

Table II.—Conditions of operation

| Case | I. No Recycle | II. With Recycle |
|---|---|---|
| Feed, mols/hr | 1,000 | 1,000 |
| Recycle: | | |
| Total, mols/hr | | 146 |
| To Bottoms, mols/hr | | 66 |
| To overhead, mols/hr | | 80 |
| Overhead, mols/hr | 347 | 427 |
| Bottoms, mols/hr | 653 | 719 |
| Reflux Ratio, O/D | 2.09 | 1.99 |
| Reflux, mols/hr | 725 | 850 |
| No. of Plates | 25 | 18 |
| Reboiler Vapor, mols/hr | 725 | 850 |
| C₄ in bottoms, mol percent | 0.9 | 10 |
| Tower Pressure, p. s. i. g | 125 | 115 |
| Distillate Drum Temp., °F | 105 | 105 |
| Bottoms Temp., °F | 335 | 290 |

From the above it is to be noted that when employing recycle for an equivalent recovery of C₄ unsaturates (97 mol %) as without employing recycle, the bottoms temperature was 290° F. while when no recycle was employed the bottoms temperature was 335° F.

The amount of recycle employed may vary appreciably depending upon operating conditions, analysis of feed and other factors. However, in general the amount of recycle is preferably in the range from about 10 to 30 mol % based upon the mols of feed.

What is claimed is:

1. A process for the production of polymerized hydrocarbons from a feed stream comprising unsaturated hydrocarbons containing four and less carbon atoms in the molecule which comprises introducing said feed stream into an intermediate point of a debutanizaiton zone, regulating the temperature in the bottom of said debutanization zone in the range from about 250° F. to 400° F. and maintaining the pressure conditions in said debutanization zone in the range from about 100 to 150 lbs. whereby a maximum segregation of said unsaturated C₄ hydrocarbons from said feed stream is secured, removing a bottoms product from said debutanization zone substantially free of unsaturated C₄ hydrocarbons, removing overhead from said debutanization zone a vapor stream comprising said unsaturated C₄ hydrocarbons, condensing said vaporous stream, polymerizing said unsaturated C₄ hydrocarbons in a polymerization zone, removing a polymerized product from said polymerization zone and passing the same to a depropanizing zone, segregating a fraction comprising C₄ saturated hydrocarbons in said depropanizing zone and recycling said stream to said debutanization zone at a point below the introduction of the feed stream whereby a lower temperature is maintained in said debutanization zone and whereby the unsaturated C₄ hydrocarbons removed overhead from said debutanization zone is diluted with saturated C₄ hydrocarbons.

2. Process as defined by claim 1 wherein the temperature in said polymerization zone is in the range from about 400 to 500° F. and wherein the pressure is in the range from 500 to 1200 lbs. per sq. in. and wherein the catalyst comprises an acid of phosphorus.

3. A process for the production of polymerized hydrocarbons from a feed stream comprising unsaturated hydrocarbons containing four and less carbon atoms in the molecule which comprises introducing said feed stream into an intermediate point of a debutanization zone, regulating temperature and pressure conditions in said debutanization zone to secure a maximum segregation of said unsaturated C₄ hydrocarbons from said feed stream, removing a bottoms product from said debutanization zone substantially free of unsaturated C₄ hydrocarbons, removing overhead from said debutanization zone a vapor stream comprising said unsaturated C₄ hydrocarbons, condensing the vapor stream removed overhead from the debutanizer, polymerizing said unsaturated C₄ hydrocarbons in a polymerization zone, removing a polymerized product from said polymerization zone and passing the same to a depropanizing zone, removing overhead from said depropanization zone hydrocarbons having three and less carbon atoms in the molecule, removing as a side stream a fraction comprising hydrocarbons containing four carbon atoms in the molecule, removing as a bottoms a stream of butane and higher boiling hydrocarbons, segregating a portion of said latter stream and combining the same with said side stream, recycling said combined stream to said debutanization zone at a point below the introduction of the feed stream whereby a lower temperature is maintained in said debutanization zone and whereby the unsaturated C₄ hydrocarbons removed overhead from said debutanization zone is diluted with saturated C₄ hydrocarbons.

4. Process as defined by claim 3 wherein the temperatures maintained in the bottom of said debutanization zone are in the range from about 250 to 400° F. and wherein the pressures are in the range from about 100 to 150 lbs. per sq. in.

5. Process as defined by claim 4 wherein the temperature in said polymerization zone is in the range from about 400 to 500° F. and wherein the pressure is in the range from 500 to 1200 lbs. per sq. in. and wherein the catalyst comprises an acid of phosphorus.

6. Process as defined by claim 5 wherein the temperatures maintained in said depropanization zone are in the range from about 150 to 400° F. while the pressures are in the range from about 100 to 250 lbs. per sq. in.

7. In a process for the polymerization of a feed stream comprising unsaturated hydrocarbons containing four or less carbon atoms wherein said feed is diluted with butane prior to polymerization by recycling butane to a debutanization tower into which said feed stream is introduced and from which a bottoms stream free of unsaturated hydrocarbons but containing at least some butane is removed, the improvement comprising introducing recycled butane vapors into said tower at a point below that at which said feed stream is introduced, whereby said butane vapors rise upwardly through said tower past the point of introduction of said unsaturated hydrocarbons, carrying said unsaturated hydrocarbons to the top of said tower, and effectively blocking said unsaturated hydrocarbons from access to the bottom of said tower.

References Cited in the file of this patent

UNITED STATES PATENTS

| | | |
|---|---|---|
| 2,470,904 | Shanley | May 24, 1949 |
| 2,493,454 | Hagy | Jan. 3, 1950 |
| 2,614,071 | Moise et al. | Oct. 14, 1952 |